United States Patent [19]
Makino et al.

[11] 3,918,294
[45] Nov. 11, 1975

[54] AXIAL FORCE MEASURING METHOD UTILIZING ULTRASONIC WAVE

[75] Inventors: Takayuki Makino, Okazaki; Haruhiko Toriyama, Toyota, both of Japan

[73] Assignee: Toyota Jidosha Kogyo Kabushiki Kaisha, Toyota, Japan

[22] Filed: Mar. 29, 1974

[21] Appl. No.: 456,285

Related U.S. Application Data

[63] Continuation-in-part of Ser. No. 196,896, Nov. 9, 1971, Pat. No. 3,822,587.

[30] Foreign Application Priority Data
Nov. 24, 1970  Japan.............................. 45-103555

[52] U.S. Cl................ 73/67.2; 73/67.8 R; 73/88 F
[51] Int. Cl.$^2$..................... G01H 13/00; G01L 5/12
[58] Field of Search............... 73/67.2, 67.7, 67.8 R, 73/88 F

[56] References Cited
UNITED STATES PATENTS

| | | |
|---|---|---|
| 2,137,852 | 11/1938 | Nicolson....................... 73/67.2 UX |
| 3,153,338 | 10/1964 | Kleesattel............................ 73/67.1 |
| 3,306,100 | 2/1967 | Wilhelm et al...................... 73/67.2 |

FOREIGN PATENTS OR APPLICATIONS

| | | |
|---|---|---|
| 1,497,834 | 9/1967 | France................................. 73/88 F |

OTHER PUBLICATIONS

Ultrasonic Wave Velocity Changes with Stress, Ultrasonics, Apr.–June 1964, p. 95.

*Primary Examiner*—Richard C. Queisser
*Assistant Examiner*—John P. Beauchamp
*Attorney, Agent, or Firm*—Stevens, Davis, Miller & Mosher

[57]  ABSTRACT

A method of measuring axial force existing in a bolt or the like from two natural resonant frequency values of the bolt, the one of which being obtained when the axial force is zero under forced oscillation caused by an ultrasonic wave of a specific frequency, while the other being obtained when the axial force to be measured exists under forced oscillation caused by ultrasonic wave of the same frequency.

2 Claims, 7 Drawing Figures

FIG. 5

AXIAL FORCE MEASURING METHOD UTILIZING ULTRASONIC WAVE

CROSS REFERENCE TO RELATED APPLICATION

This application is a continuation-in-part application of our copending application Ser. No. 196896 filed on Nov. 9, 1971, now U.S. Pat. No. 3,822,587.

SUMMARY OF THE INVENTION

This invention relates to a method of measuring axial forces existing in the bolts or the like easily and non-destructively by using ultrasonic waves.

In the measurement of the axial forces of bolts and the like, there has generally been employed a method in which the axial force (Q) of a bolt or the like is estimated from the tightening force (T) applied thereto. However, such a way of measuring is not reliable since the tightening force does not always represent the exact axial force.

There has also been employed a method in which the axial force of a bolt or the like is determined by measuring the amount of strain in the bolt, caused by the axial force, by means of a resistance wire strain gauge. This method is also disadvantageous in that this method required some test pieces which are drilled to provide for attachment of the resistance wire strain gauge.

Recently, it has become available to measure the axial force from the values of the natural resonant frequency of the bolt under forced oscillation caused by ultrasonic wave. Such ultrasonic method is superior in that the axial force can be measured easily and non-destructively.

The present invention aims at providing an ultrasonic method of measuring axial force which method is improved in that it provides more accurate measuring when compared with conventional ultrasonic measuring method.

According to the invention, there is provided a method of obtaining a measure of an axial force within an article under strain from a variation of natural frequencies of said article, comprising the steps of: applying an ultrasonic wave to said article to generate forced oscillations therein; measuring a first natural frequency of said article when said axial force within said article is substantially zero; measuring a second natural frequency of said article when said article is under strain and said axial force is greater than zero; determining differential $(f\epsilon_2 - f\epsilon_1)$ between said first and second natural frequencies; and comparing thus determined differential with calibration data which has been obtained with respect to axial force versus differential to locate the existing axial force; wherein the frequency of said ultrasonic wave is such one as to satisfy the equation, $$(f\epsilon_2 - f\epsilon_1)/f\epsilon_1 = k\{(1-\nu\epsilon_1) \sqrt{1+\epsilon_1}/(1-\nu\epsilon_1) \sqrt{1+\epsilon_2}\} - 1,$$

where $f\epsilon_1$ is the first measured natural frequency of said article when the strain thereof is $\epsilon_1$ ($\epsilon_1 \approx 0$), $f\epsilon_2$ is the second measured natural frequency of said article when the strain thereof is $\epsilon_2$ ($\epsilon_2 > 0$), K is a constant greater than 3, and $\nu$ is Poisson's ratio.

According to another aspect of the invention, there is provided a method of obtaining a measure of an axial force within an article under strain from a variation of natural frequencies of said article, comprising the steps of: applying an ultrasonic wave to said article to generate forced oscillations therein; measuring a first natural frequency of said article when said axial force within said article is substantially zero; measuring a second natural frequency of said article when said article is under strain and said axial force is greater than zero; determining the ratio of change $(f\epsilon_2 - f\epsilon_1)/f\epsilon_1)$ between said first and second natural frequencies; and comparing thus determined ratio with calibration data which has been obtained with respect to axial force versus ratio of change; wherein the frequency of said ultrasonic wave is such one as to satisfy the equation, $$(f\epsilon_2 - f\epsilon_1)/f\epsilon_1 = K\{(1-\nu\epsilon_2) \sqrt{1+\epsilon_1}/(1-\nu\epsilon_1) \sqrt{1+\epsilon_2}\} - 1,$$

where the symbols represent the same as used in the statement of the first aspect of the invention.

The present invention will be described in detail hereinafter with reference to the accompanying drawings in which;

FIG. 1 is a diagrammatical view illustrating the relationship between the axial force and the tightening torque of a bolt or the like;

First of all, a general method of measuring the natural frequency $f$ of an article by means of ultrasonic wave will be explained with reference to FIGS. 2a and 2b.

Figure 1:
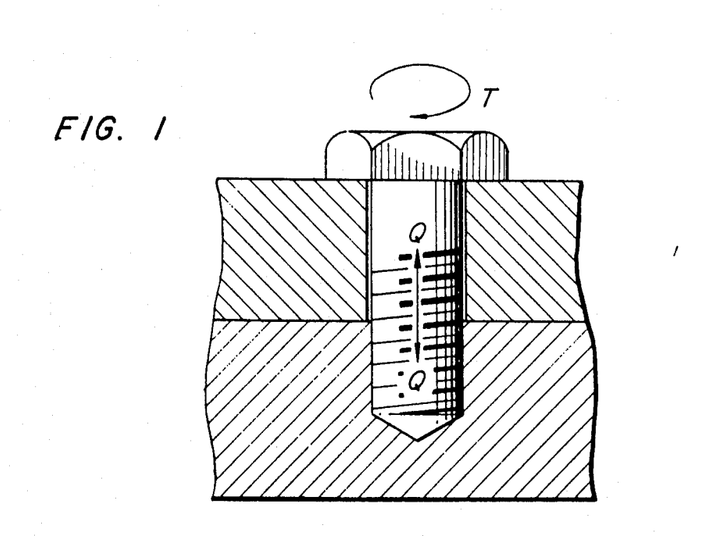
Figure 2A:
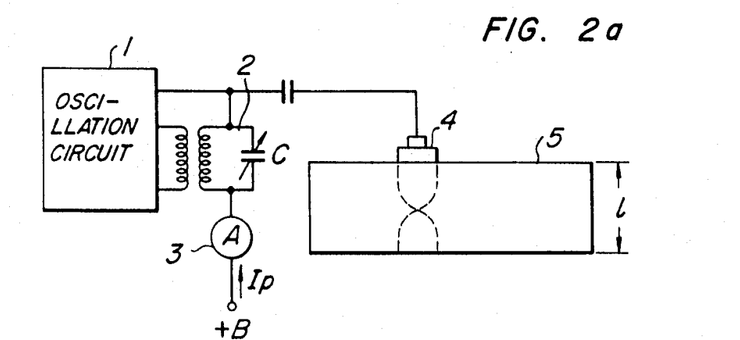
FIG. 2a is a diagram showing an example of a measuring circuit for measuring the natural frequency of an article.

Referring to FIG. 2a, reference numeral 1 designates an oscillation circuit for varying the frequency of oscillation, 3 an ammeter for indicating the current $I_p$ flowing through the oscillation circuit, 4 an ultrasonic wave oscillator consisting of crystal or barium titanate ceramic, and 5 an article presented for the measuring.

When the oscillating wave generated by the oscillation circuit 1 is applied to the ultrasonic wave oscillator 4 to radiate the ultrasonic wave to the article 5 and the oscillation frequency is varied by a variable condenser C in the tuning circuit 2, the node and antinode of the oscillating wave are formed at predetermined positions in the article as indicated by the dotted lines in FIG. 2.

Thus, when the frequency is such that the thickness $l$ of the article and the wavelength of the ultrasonic wave in said article are in a specific relationship with each other, a simple harmonic motion occurs.

This simple harmonic motion is the natural oscillation of the article, and the natural frequency can be generally calculated from the following formula:

$$f = n \cdot V/2l$$

where $f$ is the natural frequency, $l$ is the length of the bolt, $V$ is the propagation speed in the article, and $n$ is a positive integer.

When $n$ is equal to 1, $f$ represents the basic frequency and when $n$ is equal to 2, 3, or 4. . . ., $f$ represents a multiple frequency.

Figure 2B:
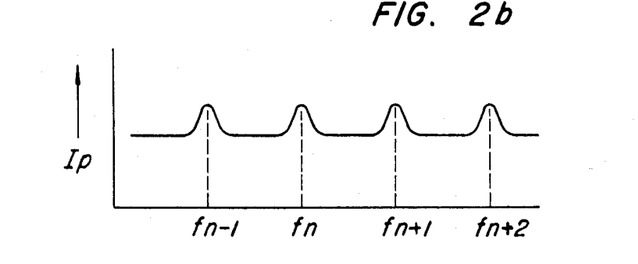
FIG. 2b is a diagram showing a current fluctuation in the oscillation circuit at the time of resonance.

The natural frequency $f$ thus generated can be measured in terms of a change of the current value Ip indicated by the ammeter 3, as shown in FIG. 2b.

Namely, when the oscillation frequency is gradually changed by the variable condenser C of the tuning circuit 2, resonance occurs in the article at the natural frequency $f$ and the current Ip increases.

Therefore, the basic frequency $f_1$ and multiple frequencies $f_2, f_3, \ldots f_n$ of the article can be readily read on a scale of the oscillation frequency $fc$ previously scaled relative to the capacity of the variable condenser C.

The basic frequency $f_1$, as will be understood from equation (2) above, is represented by $$f_1 = f_n - f_n \quad (3)$$

and, therefore, can be determined by measuring adjacent two multiple frequencies.

The natural frequency $f$ is generally given by the equation (2), and, at the same time is given by the following equation when the natural frequency is basic or fundamental one.

$$f = V/2l = \sqrt{E/\rho}/2l = \sqrt{EV/M}/2l \quad (4)$$

wherein $E$ is the Young's modulus,
$\rho$ is the density,
$M$ is the mass and
$V$ is the volume of the article.

Namely, it will be understood that the natural frequency $f$ is in inverse proportion to the thickness $l$ of the article and in proportion to the square root of the volume V and the Young's modulus of the same.

Now, a discussion will be made on the natural frequency change resulting from occurrence of a strain in an article to be measured. When a load is exerted, for example, on a cylindrical body to cause a tensile strain $\epsilon$, the changing ratio of the natural frequencies before and after the exertion of load is represented by the following formula, provided that Young's modulus E and the mass M of the cylindrical body are constant:

$$(f_\epsilon - f_o)/f_o = \{\sqrt{V_\epsilon/V_o}(l_\epsilon/l_o)\} - 1$$
$$= \{(1-\nu\epsilon)/\sqrt{1+\epsilon}\} - 1 \quad (5)$$

wherein the changing ratio is represented by $f_\epsilon - f_o/f_o$; $f_o$ and $f_\epsilon$ stand for the natural frequencies before and after the strain $\epsilon$ is imparted to the cylindrical body; $l_o$ and $l_\epsilon$, $V_o$ and $V_\epsilon$ are the lengths and volumes of the cylindrical body before and after the strain $\epsilon$ is imparted to the cylindrical body; and $\nu$ the Poisson's ratio.

Supposing that a tensile strain of 0.3% occurred in the cylindrical body, the natural frequency changing ratio can be determined as follows based on the Poisson's ratio $\nu = 0.3$:

$$(f_\epsilon - f_o)/f_o = (1-0.3 \times 0.003)/\sqrt{1+0.003} - 1 \doteq -0.0024 \quad (6)$$

and it will be seen that the natural frequency is lowered by 0.24% as a result of occurrence of 0.3% tensile strain.

Further, the changing ratio of the natural frequencies $f_1$ and $f_2$ in the case of the strain being $\epsilon_1$ ($\epsilon_1 \ne \epsilon_2$) and $\epsilon_2$ ($\epsilon_2 > 0$) is respresented by the following formula:

$$(f_{\epsilon_2}-f_{\epsilon_1})/f_{\epsilon_1} = \{(1-\nu\epsilon_1)\sqrt{1+\epsilon_1}/(1-\nu\epsilon_1)\sqrt{1+\epsilon_2}\}-1 \quad (7)$$

The inventors, during the process of analyzing the relationship between the actually measured changing ratio of the natural frequencies and the changing ratio calculated from above equation (7), found that there occurs an entirely unknown phenomenon that the frequency values $f_{\epsilon_1}$ and $f_{\epsilon_2}$ vary drastically according to the frequency of the ultrasonic wave used in the measuring.

Namely, it was noted that, while the actually measured changing ratio well suits to the theoretical relationship as defined by the equations 5 and 7 as far as the frequency of ultrasonic wave used for measuring is lower than some 2 or 3 MHz, the measured changing ratio becomes much greater than the theoretical value of changing ratio as obtained from the equations when the ultrasonic frequency used for measuring exceeds several MHz.

This newly found out phenomenon will be explained with reference to FIG. 3.

Figure 3:
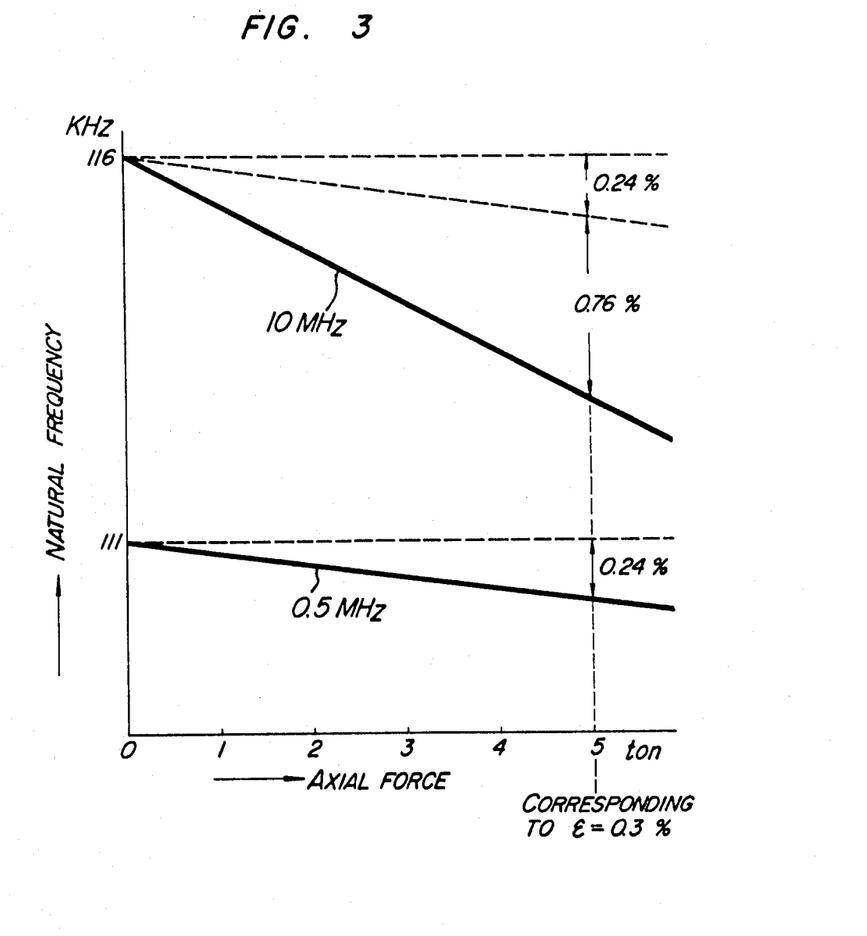
FIG. 3 is a diagram exemplifying graphically the relationship between the axial forces and the natural frequencies of a specific bolt for use in automobiles, established by selectively using two ultrasonic wave frequencies.

FIG. 3 shows a representative example of the results of the experiments to seek the relationship between the axial force within a bolt and the natural frequency of the bolt.

Two ultrasonic wave of different frequencies are employed, the one of which being of 0.5 MHz while the other being of 10 MHz. The bolt presented for the experiment is 10 mm in diameter, 25 mm in length and about 0.3 in Poisson's ratio.

In FIG. 3, the axis of abscissa is scaled by axial force and the axis of ordinate by natural frequency.

As seen for the diagram, at the point where the axial force amounts to 5 tons (The strain is calculated to be about 0.3% at this point), the natural frequency changing ratio calculated from the measured natural frequency values amounts to 0.24% which value well suits to the theoretical value as obtained from the equation 6 when measured by the ultrasonic wave of 0.5 MHz, whereas the changing ratio reaches 1.0% at that point in case that the measuring frequency of 10 MHz is used.

Thus, when a constant value K is defined as the ratio between the actually measured changing ratio and the theoretically calculated changing ratio, i.e., when the value K is defined by $$K = \frac{f_{\epsilon_2}-f_{\epsilon_1}/f_{\epsilon_1}}{\{(1-\nu\epsilon_1)\sqrt{1+\epsilon_1}/(1-\nu\epsilon_1)\sqrt{1+\epsilon_2}\}-1} \quad (8).$$

it is calculated that the $K$ amounts to about 4.0 when measuring is made by ultrasonic wave of 10 MHz, whereas $K$ is calculated to be about 1.0 when the frequency of the ultrasonic wave employed in the measuring is 0.5 MHz.

In other words, the changing ratio of the natural frequency obtained by using measuring frequency of 10 MHz is 4 times as great as that obtained by using measuring frequency of 0.5 MHz.

In order to confirm this newly found out phenomenon, a further experiment was conducted to seek the relationship between the changing ratio $(f_{\epsilon_2}-f_{\epsilon_1}/f_{\epsilon_1})$ of the natural frequency and the varying measuring frequency.

Three bolts were presented for the experiment each one of which being 10.23 mm in effective diameter, 25 mm in length, 0.29 in Poisson's ratio and 21000 kg/mm² in Young's modulus.

For each bolt, natural frequencies $(f_{\epsilon_2})$ was measured when the axial force within the bolt is 2 tons and 4 tons respectively, by using ultrasonic wave of 1 MHz, 3 MHz, 4 MHz, 5 MHz and 8 MHz respectively, as well as the natural frequencies $(f_{\epsilon_1})$ when the axial force is zero by using above ultrasonic waves.

The natural frequencies $f_{\epsilon_1}$ and $f_{\epsilon_2}$ thus measured was then calculated to obtain the changing ratio ($f_{\epsilon_2}-f_{\epsilon_1}/f_{\epsilon_1}$) as summarized in Table 1.

Thus, if it is intended to locate the existing axial force by comparing measured difference ($f_{\epsilon_2}-f_{\epsilon_1}$) or measured changing ratio ($f_{\epsilon_2}-f_{\epsilon_1}/f_{\epsilon_1}$) with the calibration data which has been obtained with respect to axial

TABLE I

| No. of the bolt | Measuring Frequency Axial Force (Ton) | 1 MHz $f_{\epsilon_1}$ or $f_{\epsilon_2}$ KHz | $f_{\epsilon_2}-f_{\epsilon_1}/f_{\epsilon_1}$ ×10⁻³ | 3 MHz $f_{\epsilon_1}$ or $f_{\epsilon_2}$ KHz | $f_{\epsilon_2}-f_{\epsilon_1}/f_{\epsilon_1}$ ×10⁻³ |
|---|---|---|---|---|---|
| 1 | 0 | 112.42 | 0 | 115.93 | 0 |
|   | 2 | 112.26 | −1.42 | 115.66 | −2.33 |
|   | 4 | 112.11 | −2.76 | 115.37 | −4.83 |
| 2 | 0 | 112.30 | 0 | 115.78 | 0 |
|   | 2 | 112.15 | −1.34 | 115.53 | −2.16 |
|   | 4 | 112.01 | −2.58 | 115.24 | −4.66 |
| 3 | 0 | 112.08 | 0 | 115.52 | 0 |
|   | 2 | 111.97 | −0.98 | 115.28 | −2.08 |
|   | 4 | 111.81 | −2.41 | 115.02 | −4.33 |

| 4 MHz $f_{\epsilon_1}$ or $f_{\epsilon_2}$ KHz | $f_{\epsilon_2}-f_{\epsilon_1}/f_{\epsilon_1}$ ×10⁻³ | 5 MHz $f_{\epsilon_1}$ or $f_{\epsilon_2}$ KHz | $f_{\epsilon_2}-f_{\epsilon_1}/f_{\epsilon_1}$ ×10⁻³ | 8 MHz $f_{\epsilon_1}$ or $f_{\epsilon_2}$ KHz | $f_{\epsilon_2}-f_{\epsilon_1}/f_{\epsilon_1}$ ×10⁻³ |
|---|---|---|---|---|---|
| 116.78 | 0 | 116.75 | 0 | 116.70 | 0 |
| 116.38 | −3.43 | 116.37 | −3.25 | 116.30 | −3.43 |
| 116.04 | −6.34 | 116.02 | −6.25 | 115.98 | −6.17 |
| 116.55 | 0 | 116.53 | 0 | 116.51 | 0 |
| 116.17 | −3.26 | 116.16 | −3.18 | 116.13 | −3.27 |
| 115.85 | −6.01 | 115.82 | −6.09 | 115.82 | −5.92 |
| 116.25 | 0 | 116.22 | 0 | 116.22 | 0 |
| 115.88 | −3.18 | 115.86 | −3.10 | 115.87 | −3.01 |
| 115.57 | −5.85 | 115.53 | −5.94 | 115.55 | −5.25 |

Figure 6:
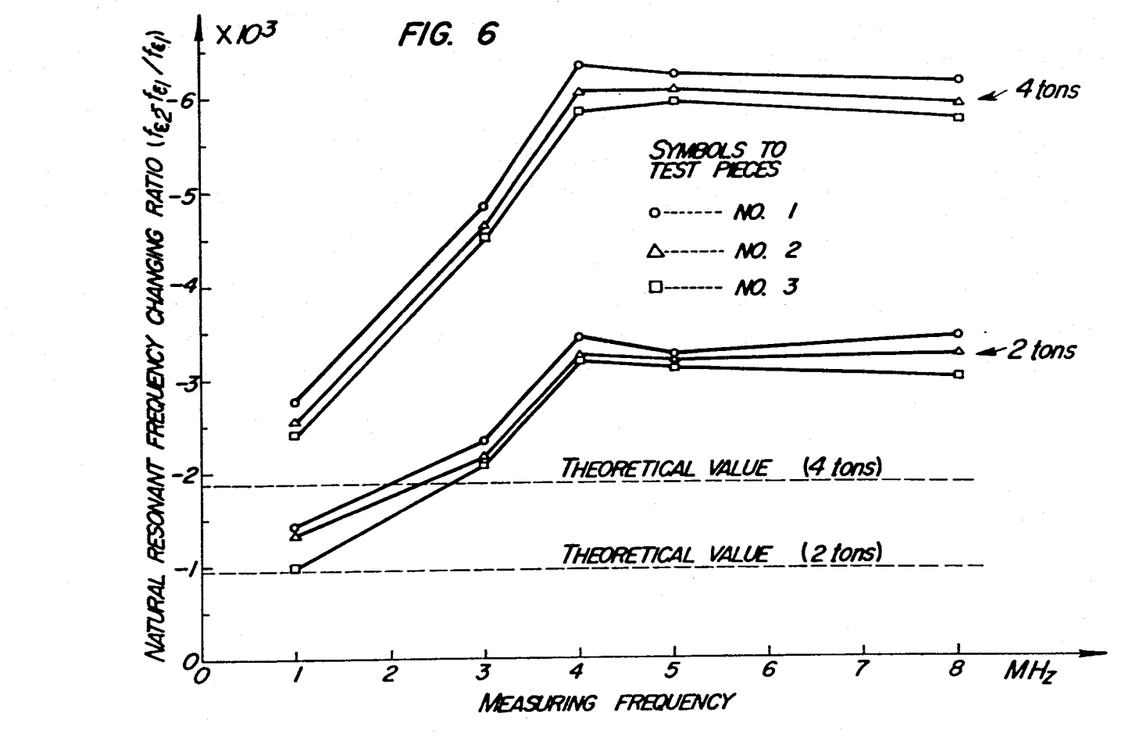
FIG. 6 is a diagram showing the relationship between the frequencies of measuring ultrasonic wave and the ratios of changes of natural frequencies.

The diagram of FIG. 6, which is plotted in accordance with the values of Table 1, shows that when the measuring frequency exceeds 4 MHz, the changing ratios are almost constant for varying measuring frequencies and are averaged at 0.61% when the axial force is 4 tons and at 0.32% when the axial force is 2 tons, respectively.

The theoretical values of the changing ratio in turn are calculated from equations 5 to be 0.1786% and 0.0893%, respectively.

Thus, it will be seen from FIG. 6, that the changing ratio measured by ultrasonic wave of a frequency higher than 4 MHz well reaches 3.5 times as large as the theoretical value, and this means that the value of K in the equation (8) amounts to 3.5.

As described above, when a specific frequency is employed for the measuring, the measured changing ratio of natural frequency well reaches more than 3 times as large as the theoretical value.

Although this newly found out phenomenon, which has been confirmed through many experiments, has not been theoretically developed yet, it is true that axial forces can be measured more accurately when this newly found out phenomenon is positively utilized in the measuring.

Namely, if the measuring were conducted using an ultrasonic wave of such frequency as to make the value of K in the equation (8) greater than 3, the difference between natural frequencies at zero force and at loaded condition (i.e. $f_{\epsilon_2}-f_{\epsilon_1}$), as well as the changing ratio of the natural frequency (i.e. $f_{\epsilon_2}-f_{\epsilon_1}/f_{\epsilon_1}$), becomes much greater in comparison with the conventional case as utilizes relatively low measuring frequency which presents the value of changing ratio close to the theoretical value.

force versus difference or axial force versus changing ratio, respectively, the axial force can be located more exactly when above specific measuring frequency is used in comparison with the case where relatively low measuring frequency, say 0.5 MHz, is used.

Those skilled in the art would easily understand that the larger the difference or the changing ratio becomes, the more accurate measuring can be expected.

Figure 5:
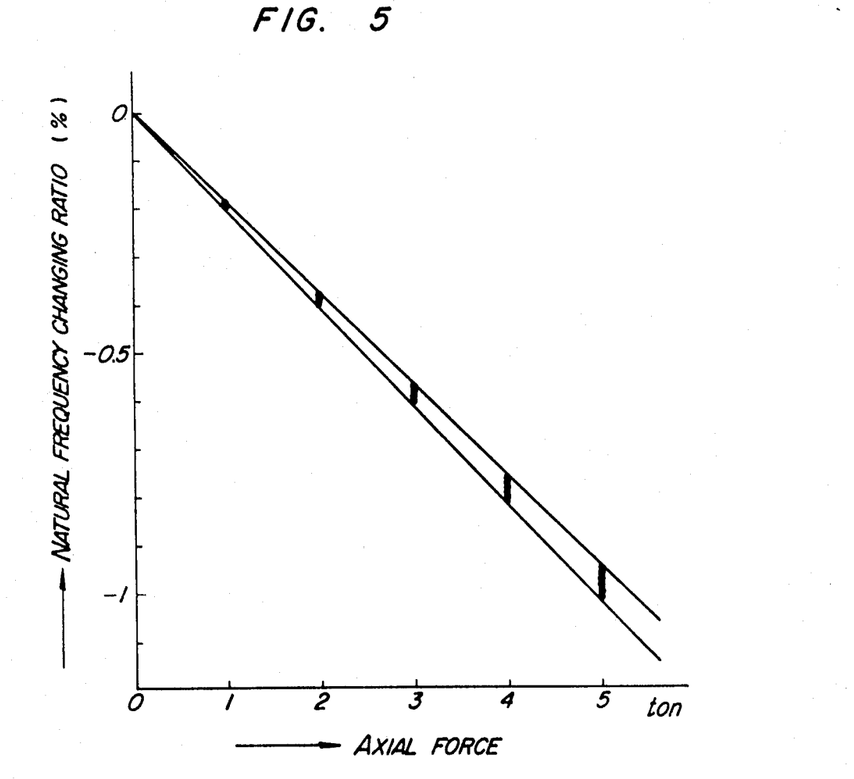
FIG. 5 is a diagram graphically exemplifying the relationship between the axial forces and the ratios of changes of natural frequencies.

FIG. 5 shows a graph representing the relationship between the varying axial force and the frequency changing ratio.

The graph in FIG. 5 was obtained in the following manner.

50 pieces of ring gear setting bolts for vehicles were presented for the test.

The first natural frequency (i.e. $f_{\epsilon_1}$) was measured for each bolt at zero force using an ultrasonic wave of 10 MHz.

Then the second natural frequencies (i.e. $f_{\epsilon_2}$) were measured by the same measuring frequency and where the axial force is 1, 2, 3, 4 and 5 tons respectively for each bolt. The axial forces were read from a tensile testor.

Then the frequency changing ratio (i.e. $f_{\epsilon_2}-f_{\epsilon_1}/f_{\epsilon_1}$) was calculated with respect to each axial force for each bolt.

The upper and lower curve show the upper and lower extremes of fluctuation among 50 measurements.

It will be understood that the changing ratio decreases steeply as the axial force increases, so that one can exactly locate the existing axial force by comparing measured changing ratio with the data on the curve of FIG. 5 when it is utilized as a calibration curve.

Although above explanation was made with respect to a method in which the measured changing ratio is compared with the calibration data which has been drawn with respect to the changing ratio versus axial force, it is fairly possible to use a calibration data which concerns the difference ($f_{\epsilon_2}-f_{\epsilon_1}$) versus axial force. In the latter case, natural frequency ($f_{\epsilon_1}$) at zero force and natural frequency ($f_{\epsilon_2}$) at loaded condition are measured using an ultrasonic wave of a frequency, for example 10 MHz, and then the difference ($f_{\epsilon_2}-f_{\epsilon_1}$) is calculated to be compared with the calibration data.

It will be understood that, when such specific measuring frequency as makes the value of K in the equation (8) larger than 3, for example 10 MHz, a larger value of the difference can be obtained for a change in axial force comparing with the case where relatively low measuring frequency, for example 0.5 MHz, as will be seen from FIG. 3.

Thus, by comparing the measured difference with the calibration data which are drawn with respect to the difference versus axial force, one can know the existing axial force more exactly than the case where relatively low measuring frequency is used, and this entirely owes to the newly found out phenomenon of the present invention.

The above explanation was made with respect to the cases where the natural frequency of the bolt at zero force can be measured.

Apart from above, the present invention is also applicable to the cases where the natural frequency of the bolt at zero force cannot be measured.

Figure 4:
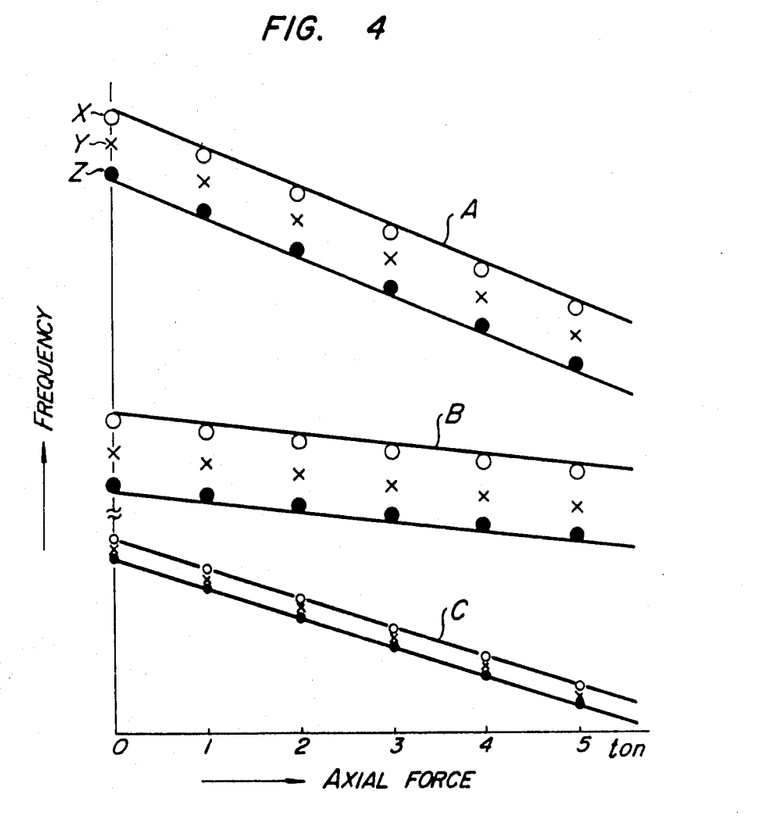
FIG. 4 is a diagram graphically showing the relationship between axial forces and natural frequencies of a number of bolts for use in automobiles, established by selectively using two ultrasonic frequencies.

In other words, the present invention enables it to measure the axial force of the bolt at tightened condition without loosening it, as described hereunder with reference to FIG. 4.

FIG. 4 shows by way of example the relationships between the axial force and the natural frequency, actually measured on 50 ring gear setting bolts for automobiles by using ultrasonic frequencies of about 0.5 MHz and about 10 MHz. The vertical axis represents the natural frequency, while the abscissa indicates the readings of the tensile tester or any other conventional means which can indicate the axial force within the article.

In the diagram, characters A and B represent the data measured by using ultrasonic waves of frequencies of about 10 MHz and 0.5 MHz respectively, and character C represents a graph obtained by subtracting the data of B from the data of A. In each of the A, B and C, the data of three representative bolts X, Y and Z located at the upper limit, the middle portion and the lower limit thereof are indicated by O, X and ● respectively.

It is considered that the fluctuations which occur among measured values of several articles, such as the values of X, Y and Z, is attributable to the irregularities in length, heat-treating conditions and concentrations of ingredients of the bolt. It is observed that the fluctuation, i.e. the deviation from the mean or standard value is common for all measuring frequencies.

Therefore, by drawing a graph by plotting the differences between the values obtained by using the ultrasonic wave of a frequency of about 10 MHz and the values obtained by using the ultrasonic wave of a frequency of about 0.5 MHz, on each bolt, the fluctuation is negated and decreased as shown by C in FIG. 4.

It will be appreciated that by using two ultrasonic waves for measuring, two curves such as A and B can be obtained on a bolt at assembled and tightened condition, which make it possible to negate and decrease the fluctuation promising more accurate measuring, and this entirely owes to the newly found out phenomenon.

It will be obviously understood that by measuring the natural frequencies of a bolt by using the two ultrasonic waves of frequencies of about 10 MHz and 0.5 MHz, calculating the difference between the measured values of natural frequencies and comparing the calculated difference with a calibration curve previously drawn on the bolt with respect to axial force versus the difference, the value of the axial force within the bolt can be readily obtained.

Thus, the axial force of the bolt can be readily, accurately, simply and non-destructively determined in its assembled state without the necessity of previously measuring the natural frequency of the bolt before it is tightened.

Although the foregoing description has been given on a method of determining the axial force of a bolt or the like by measuring the natural frequencies thereof, it will be understood that measuring the propagation time has exactly the same significance as that of measuring the natural frequency, because the reciprocating propagation time T of ultrasonic wave in a bolt or the like can be expressed by the following formula:

$$T = 2l/V = 1/(V/2l) = 1/f \quad (9)$$

Namely, the axial force of a bolt or the like can of course be determined by measuring the reciprocating time of ultrasonic wave in the bolt or the like, i.e. the period from the ultrasonic wave is projected from one end of the bolt or the like to the time when it returns to said end upon reflecting at the other end, by using, for example, an ultrasonic reflectroscope.

As described herein in detail, the method of the present invention provides, simple, highly accurate and non-destructive measuring of the axial force existing within articles.

What is claimed is:

1. A method of obtaining a measure of an axial force within an article under strain from a variation of natural frequencies of said article, comprising the steps of: applying an ultrasonic wave to said article to generate forced oscillations therein; measuring a first natural frequency of said article when said axial force within said article is substantially zero; measuring a second natural frequency of said article when said article is under strain and said axial force is greater than zero; determining differential ($f_{\epsilon_2}-f_{\epsilon_1}$) between said first and second natural frequencies; and comparing thus determined differential with calibration data which has been obtained with respect to axial force versus differential to locate the existing axial force; the frequency of said ultrasonic wave being selected to satisfy the equation, $$(f_{\epsilon_2}-f_{\epsilon_1})/f_{\epsilon_1}=K\{(1-\nu\epsilon_2)\sqrt{1+\epsilon_1}/(1-\nu\epsilon_1)\sqrt{1+\epsilon_2}\}-1],$$

where $f_{\epsilon_1}$ is the first measured natural frequency of said article when the strain thereof is $\epsilon_1$ ($\epsilon_1 \geq 0$), $f_{\epsilon_2}$ is the second measured natural frequency of said article when the strain thereof is $\epsilon_2$ ($\epsilon_2 > 0$), K is a constant greater than 3, and $\nu$ is Poisson's ratio.

2. A method of obtaining a measure of an axial force within an article under strain from a variation of natural frequencies of said article, comprising the steps of: applying an ultrasonic wave to said article to generate forced oscillations therein; measuring a first natural frequency of said article when said axial force within said article is substantially zero; measuring a second natural frequency of said article when said article is under strain and said axial force is greater than zero;

determining the ratio of change $(f_{\epsilon_2}-f_{\epsilon_1}/f_{\epsilon_1})$ between said first and second natural frequencies; and comparing thus determined ratio with calibration data which has been obtained with respect to axial force versus ratio of change; the frequency of said ultrasonic wave being selected to satisfy the equation, $$(f_{\epsilon_2}-f_{\epsilon_1})/f_{\epsilon_1} = \{K[(1-\nu\epsilon_2)\sqrt{1+\epsilon_1}/(1-\nu\epsilon_1)\sqrt{1+\epsilon_2}]-1\}$$

where $f_{\epsilon_1}$ is the first measured natural frequency of said article when the strain thereof is $\epsilon_1$ ($\epsilon_1 \gtrless 0$), $f_{\epsilon_2}$ is the second measured natural frequency of said article when the strain thereof is $\epsilon_2$ ($\epsilon_2 > 0$), $K$ is a constant greater than 3, and $\nu$ is Poisson's ratio.

* * * * *